United States Patent
Joshi et al.

(10) Patent No.: US 9,660,530 B2
(45) Date of Patent: May 23, 2017

(54) RESONANT VIRTUAL SUPPLY BOOSTER FOR SYNCHRONOUS DIGITAL CIRCUITS HAVING A PREDICTABLE EVALUATE TIME

(71) Applicant: INTERNATIONAL BUSINESS MACHINES CORPORATION, Armonk, NY (US)

(72) Inventors: Rajiv V. Joshi, Yorktown Heights, NY (US); Matthew M. Ziegler, Sleepy Hollow, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/828,715

(22) Filed: Aug. 18, 2015

(65) Prior Publication Data
US 2017/0025949 A1    Jan. 26, 2017

Related U.S. Application Data

(63) Continuation of application No. 14/807,064, filed on Jul. 23, 2015.

(51) Int. Cl.
*H02M 3/158* (2006.01)

(52) U.S. Cl.
CPC ................ *H02M 3/158* (2013.01)

(58) Field of Classification Search
CPC . G05F 3/262; G05F 3/265; G05F 3/30; G05F 3/205; G11C 5/147
USPC .................. 327/530, 538, 544, 536
See application file for complete search history.

(56) References Cited

U.S. PATENT DOCUMENTS

| | | | | |
|---|---|---|---|---|
| 4,720,667 A | * | 1/1988 | Lee et al. | 323/271 |
| 5,168,176 A | * | 12/1992 | Wanlass | 326/87 |
| 7,742,388 B2 | | 6/2010 | Shearer et al. | |
| 7,830,203 B2 | * | 11/2010 | Chang et al. | 327/544 |
| 9,036,430 B2 | | 5/2015 | Joshi et al. | |
| 2002/0057126 A1 | | 5/2002 | Hsu et al. | |
| 2002/0130699 A1 | | 9/2002 | Zimlich | |

(Continued)

OTHER PUBLICATIONS

U.S. Appl. No. 14/807,064, filed Jul. 23, 2015, Joshi, et al.
(Continued)

*Primary Examiner* — Quan Tra
(74) *Attorney, Agent, or Firm* — Mitch Harris, Atty at Law, LLC; Andrew M. Harris; Steven L. Bennett (57) ABSTRACT

A booster for a digital circuit block provides speed and reliability at lower static power supply voltages, reducing overall power consumption of the circuits. The booster includes a transistor that couples a dynamic power supply node to a static power supply and is disabled in response to a boost clock. An inductor and capacitance, which may be the block power supply shunt capacitance, coupled to the dynamic power supply resonates so that the voltage of the dynamic power supply increases in magnitude to a value greater the static power supply voltage. A boost transistor is included in some embodiments to couple an edge of the clock to the dynamic power supply, increasing the voltage rise. Another aspect of the booster includes multiple boost transistors controlled by different boost clock phases so that the resonant boost circuit is successively stimulated to increase the amount of voltage rise.

6 Claims, 11 Drawing Sheets

(56) References Cited

U.S. PATENT DOCUMENTS

| | | |
|---|---|---|
| 2006/0171223 A1 | 8/2006 | Kim |
| 2008/0074175 A1* | 3/2008 | Huang ............... H03K 19/0016 |
| | | 327/544 |
| 2008/0157849 A1* | 7/2008 | Ito ........................ H02M 3/156 |
| | | 327/419 |
| 2011/0216604 A1 | 9/2011 | Mikajiri et al. |
| 2011/0260781 A1 | 10/2011 | Takeuchi et al. |

OTHER PUBLICATIONS

Joshi, et al., "A Floating-Body Dynamic Supply Boosting Technique for Low-Voltage SRAM in Nanoscale PD/SOI CMOS Technologies", 2007 ACM/IEEE International Symposium on Low Power Electronics and Design (ISPLED '07), Aug. 27-29, 2007, 6 pages (pp. 1-6 in pdf), IEEE, Portland, OR.

List of IBM Patents or Patent Applications Treated as Related, 1 page.

\* cited by examiner

RESONANT VIRTUAL SUPPLY BOOSTER FOR SYNCHRONOUS DIGITAL CIRCUITS HAVING A PREDICTABLE EVALUATE TIME

The present application is a Continuation of U.S. patent application Ser. No. 14/807,064, filed on Jul. 23, 2015 and claims priority thereto under 35 U.S.C. 120. The disclosure of the above-referenced parent U.S. patent application is incorporated herein by reference.

BACKGROUND OF THE INVENTION

1. Field of the Invention

The present invention is related to integrated circuits incorporating digital circuits, such as logic, memory and latch blocks, and more specifically to techniques for dynamically boosting the voltage of a virtual power supply rail prior to and during an evaluation time of a digital circuit block.

2. Description of Related Art

Static and Dynamic digital circuits are used in memories and logic devices to provide high frequency operation with a minimum of die area for performing logical operations and providing storage functionality. Both synchronous static and dynamic digital circuits have controlled evaluation times in that the operation of the circuit before and during a time at which an output value of the digital circuit block evaluates or changes state, i.e., is determined from the input logic, latch input or storage cell value is used advantageously to reduce circuit complexity and/or power consumption.

Groups of digital circuits, which are sometimes referred to as "macros", have been power-managed in existing circuits to reduce power consumption, except during certain intervals of time in which power supply current is drawn to provide a read or write of a storage cell value, or the determination of a logic combination. For example, a dynamic logic circuit may draw no current, or have very low leakage current levels, except when a signal node is pre-charged with a voltage and then selectively discharged to produce the combinatorial output or storage cell value. A static logic circuit or storage cell only draws significant current when a state change occurs.

Digital circuits have been implemented that include virtual power supply nodes that can be disabled or set to a reduced voltage when the logic circuits are not evaluating, or multiple power supplies can be used to supply higher voltages to critical circuits. In some implementations, circuits have been provided that boost the power supply voltage supplied to the digital circuits during their evaluation phase to reduce the static power supply voltage by including a boost transistor. Such boosting reduces overall power supply voltage requirements. However, the energy expended in changing the voltage of the virtual power supply node voltage offsets any advantage gained, since the virtual power supply nodes typically have large shunt capacitance, i.e., capacitance between the virtual power supply node and the corresponding power supply return, due to the large numbers of devices that are connected to the virtual power supply nodes.

It would therefore be desirable to provide a virtual power supply circuit for synchronous digital circuits, and other circuits having a predictable evaluate time, that provides for reduction in overall power supply voltage and energy consumption.

BRIEF SUMMARY OF THE INVENTION

The invention is embodied in a method of operation of a virtual power supply rail booster circuit that provides reduced power consumption and supply voltage requirements.

The booster circuit includes a first transistor that couples a dynamic internal power supply node of a group of digital circuits to a static power supply that supplies a substantially constant power supply voltage to the group of digital circuits. The first transistor is disabled in response to a first phase of a boost clock that is synchronized with a functional clock of the group of digital circuits that controls evaluation for dynamic digital circuits and/or state changes for static digital circuits. The booster circuit also includes an inductor coupled to the dynamic internal power supply node for resonating with at least one capacitance coupled to the dynamic internal power supply node, which may be just the capacitance of the circuits connected to the dynamic internal power supply node. When the first transistor is disabled according to a second phase of the boost clock that corresponds to an evaluation time of the group of digital circuits, a voltage of the dynamic internal power supply node increases in magnitude to a value substantially greater than a magnitude of the power supply voltage of the by the inductor resonating with the capacitance couple to the dynamic internal power supply node. The energy used to raise the voltage of the dynamic internal power supply node is stored by the inductor and recycled. A second boost transistor, which may be a FINFET device, may be controlled by another phase of the clock to couple a rising edge of the clock to start the resonant boost. The other phase of the clock may be a delayed version of the boost clock signal.

In another aspect, the booster circuit may include multiple boost transistors that are controlled by different phases of the clock so that the resonant boost circuit is successively stimulated to increase the amount of voltage rise at the dynamic internal power supply node, and in some embodiments, multiple inductors may be coupled through multiple boost devices to the dynamic internal power supply node and stimulated in succession to increase the amount of voltage rise.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to devices containing digital circuits such as memory devices, processors and other circuits in which low-voltage and low power operation are desirable. Instead of a typical static power supply, virtual power supply rails are used to reduce the power supply rail voltage, and thus the power consumption due to leakage when the circuits in a given "macro" or circuit block are not active. In the exemplary device disclosed herein, the static power supply voltage can be further reduced, as one or more techniques for dynamically boosting the virtual power supply rail voltage are included, which extend to the use of an inductor to form a resonant circuit and/or sequencing multiple resonant or non-resonant boost circuits to increase the amount of available voltage boost. In the resonant boost configurations, the energy used to boost the virtual power supply rail voltage is stored and recycled when the voltage decreases after the boost interval, which has a timing related to a clock that controls evaluation in the digital circuit. The clock may be a clock that controls pre-charge and evaluation cycles in a dynamic digital circuit or a clock that time state changes in a static digital circuit, which is also considered an evaluation as the term is used herein.

Figure 1:
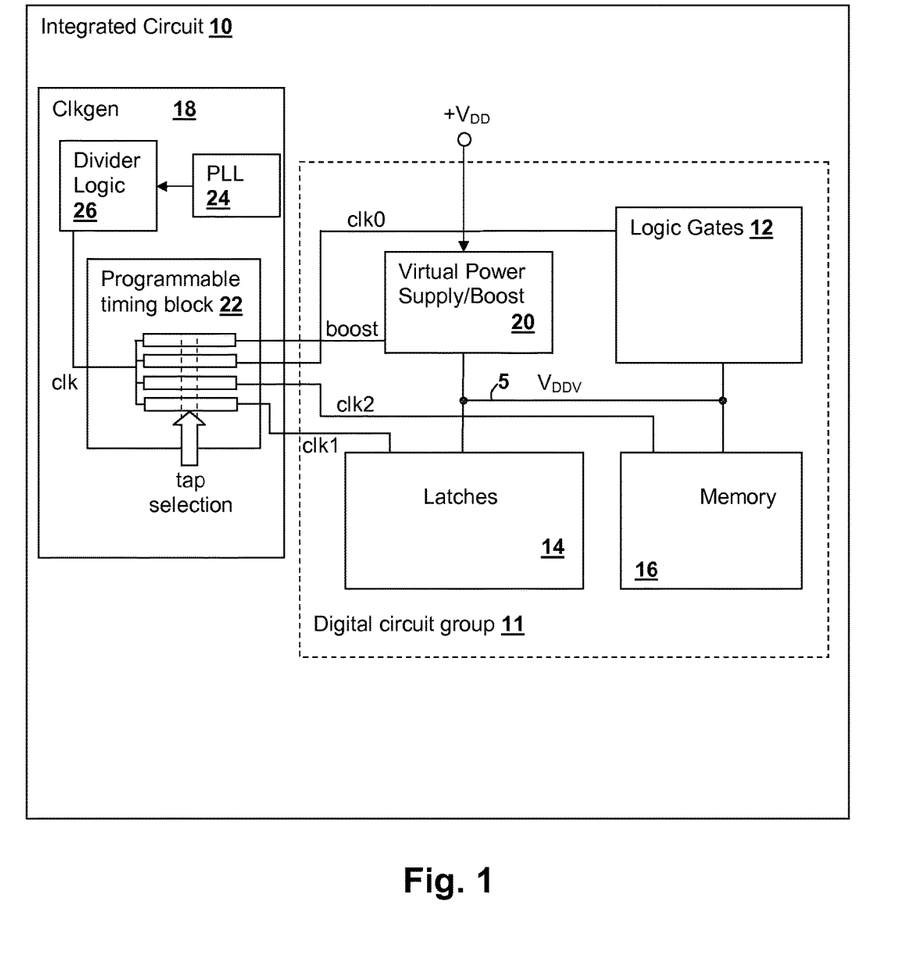
FIG. 1 is a block diagram illustrating an exemplary integrated circuit 10.

With reference now to the figures, and in particular with reference to FIG. 1, an exemplary integrated circuit (IC) 10 is shown, which may represent a processor integrated circuit, a memory device, or another very-large scale integrated circuit (VLSI) that contains logic and storage. Within IC 10, a digital circuit group 11 (or "macro") contains exemplary logic gates 12, latches 14 and memory 16, all of which are provided operating power from a dynamic internal power supply node 5 that has a voltage $V_{DDV}$ that may be varied dynamically to reduce power consumption when digital circuit group 11 is not operating or, in the case of the present example, when the circuits in digital circuit group 11 are not being readied to generate a state change. The state changes in digital circuit group 11 are synchronized by one or more clock signals provided from a clock generator 18. Exemplary clock generator 18 includes a phase-lock loop (PLL) 24 that generates a high-frequency clock, and a divider logic 26 that generates various clock phases and control signals from the high-frequency clock, including a clock signal clk that is provided to an input of a programmable timing block 22 that generates clock signals clk0, clk1, clk2 provided to digital circuit group 11, and a boost clock boost that is provided to a virtual power supply/boost circuit 20 within digital circuit group 11.

Techniques included in virtual power supply/boost circuit 20 generate peak boosted values of voltage $V_{DDV}$ on dynamic internal power supply node 5 that are substantially greater than a static power supply voltage $V_{DD}$ supplied to the input of virtual power supply/boost circuit 20 and that operates other circuits within integrated circuit 10, so that the value of static power supply voltage $V_{DD}$ can be reduced, while still meeting performance requirements within digital circuit group 11. Particular techniques to provide the boosted voltage $V_{DDV}$ are described below with reference to FIGS. 2-9. In general, virtual power supply/boost circuit 20 generates voltage $V_{DDV}$ to align a boosted portion value of output voltage $V_{DDV}$ with particular times for which the value of the voltage supplied to exemplary logic gates 12, latches 14 and memory 16 is the most critical for performance, which allows the static value of a static power supply voltage $V_{DD}$ that supplies virtual power supply/boost circuit 20 to be reduced. Generally, the boosted portion of output voltage $V_{DDV}$ is placed at the set-up interval before a static or dynamic evaluation is commenced by clock signals clk0, clk1, clk2. Programmable timing block 22 includes tapped delay lines 28 formed by buffers/inverters and selectors so that the timing of clk0, clk1, clk2 and boost clock boost are optimized for instant frequency, voltage and other environmental and circuit conditions. However, integrated circuit 10 as illustrated in FIG. 1 is only an example and fixed clock buffer chains can be employed as an alternative.

Figure 2:
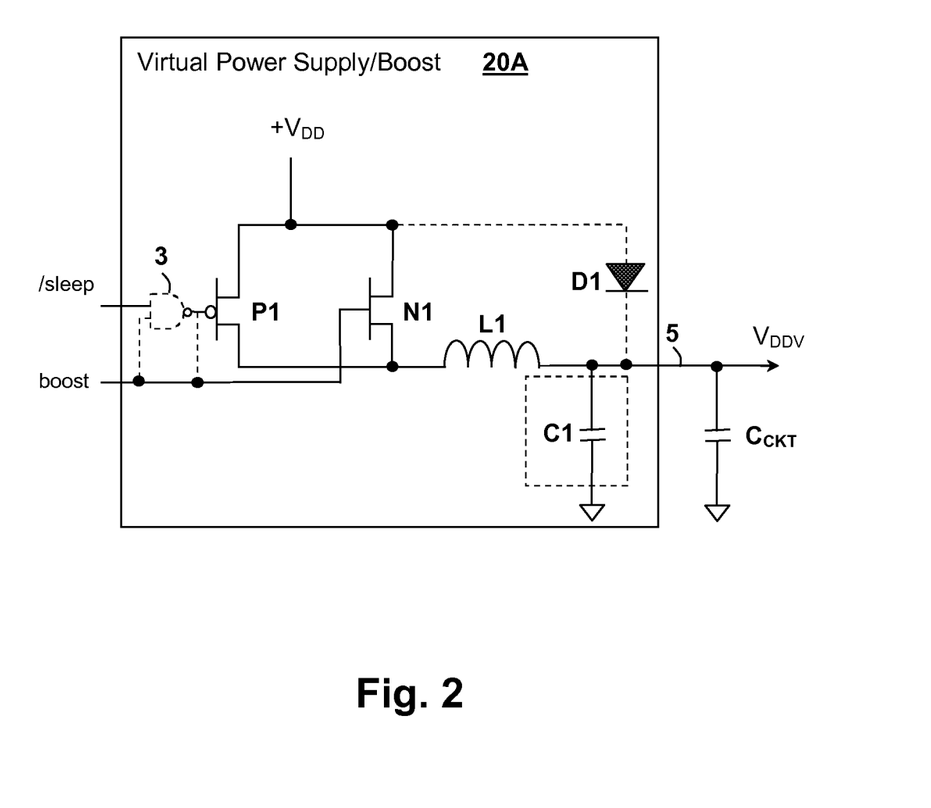
FIG. 2 is a schematic diagram of a virtual supply boost circuit 20A according to a first example that may be used in the integrated circuit of FIG. 1.

Referring now to FIG. 2, a first example of a virtual power supply/boost circuit 20A that may be used to implement virtual power supply/boost circuit 20 of integrated circuit 10 of FIG. 1 is shown. Virtual power supply/boost circuit 20A includes a first transistor P1 that clamps output virtual power supply voltage $V_{DDV}$ at the value of static power supply voltage $V_{DD}$ when boost clock boost is de-asserted, i.e., in the low voltage state in the example. Virtual power supply/boost circuit 20A also includes a second transistor, boost transistor N1, which has a body voltage stabilized initially at the value of static power supply voltage $V_{DD}$ as input clock signal boost is de-asserted. In an alternative embodiment that may be integrated with any of the embodiments shown herein, boost clock boost can be provided to the gate terminal of boost transistor N1 as described above, but the gate terminal of transistor P1 can be driven with a signal that is set to a state that disables transistor P1 when a control signal/sleep is asserted or when boost clock boost is active as provided by optional logical-NAND gate 3. By providing separate signals to control the gate terminals of transistors P1 and N1, a suspended operating mode can be provided, which reduces leakage current though virtual power supply/boost circuit 20A.

During operation of virtual power supply/boost circuit 20A, the rising edge of boost clock boost is capacitively coupled through the gate of boost transistor N1 to a terminal of an inductor L1 that couples first transistor P1 and boost transistor N1 to dynamic internal power supply node 5 as boost transistor N1 turns on. Since the current through inductor L1 is zero before the rising edge of boost clock boost and since the body of boost transistor N1 is at the value of static power supply voltage $V_{DD}$, when the rising edge of boost clock boost is coupled through inductor L1 to the dynamic internal power supply node 5, a rapid increase in current through inductor L1 causes dynamic internal power supply node voltage $V_{DDV}$ to rise with a waveshape controlled by the series resonant frequency of inductor L1 combined with the capacitance $C_{CKT}$ of all of the circuits connected to dynamic internal power supply node 5 and any additional capacitance C1 that may optionally be included in virtual power supply/boost circuit 20A. However, since boost transistor N1 is also turning on, and since shunt capacitance $C_{CKT}$ is also in parallel with leakage and active currents of the devices connected to the dynamic internal power supply node 5, the resonant behavior of inductor L1 with the total capacitance is damped and the conduction of boost transistor N1 works to prevent dynamic internal power supply node voltage $V_{DDV}$ from falling much below static power supply voltage $V_{DD}$. In general, internal power supply node voltage $V_{DDV}$ should not fall below $V_{DD}-V_T$, where $V_T$ is the threshold voltage of boost transistor N1. To prevent internal power supply node voltage $V_{DDV}$ from falling below a certain voltage level in any of the embodiments depicted herein, an optional diode D1 may be added between dynamic internal power supply node voltage $V_{DDV}$ and static power supply voltage $V_{DD}$ as illustrated, to prevent internal power supply node voltage $V_{DDV}$ from falling below $V_{DD}-V_F$, where $V_F$ is the forward voltage drop of diode D1. In the embodiments depicted herein, boost transistor N1 may be a FinFET device, which has a large gate to body capacitive coupling and is advantageous for such applications.

Figure 3A:
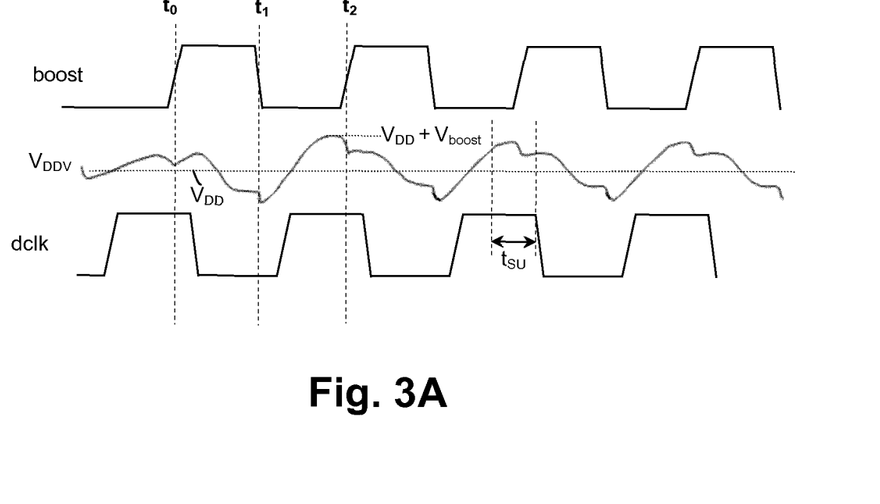
FIG. 3A is a waveform diagram illustrating signals within virtual power supply/boost circuit 20A of FIG. 2.

Referring now to FIG. 3A, waveforms within virtual power supply/boost circuit 20A are shown. At time $t_0$, boost clock boost rises, turning transistor P1 off, which causes the voltage across inductor L1 to rise. Boost clock boost also couples through the gate of boost transistor N1 to the source of boost transistor N1, further contributing to the voltage rise of dynamic internal power supply node voltage $V_{DDV}$. When boost clock boost is asserted on a next cycle at time $t_1$, because inductor L1 has decoupled dynamic internal power supply node voltage $V_{DDV}$ from the source of transistor P1, the source terminal of transistor P1 and the source of boost transistor N1 will be clamped to static power supply voltage $V_{DD}$, while dynamic internal power supply node voltage $V_{DDV}$ continues to follow a sinusoidal shape that peaks just prior to the next de-assertion of boost clock signal boost. As seen in FIG. 3A when boost clock boost is de-asserted at time $t_2$, dynamic internal power supply node voltage $V_{DDV}$ is substantially greater than static power supply voltage $V_{DD}$ and has been for an interval sufficient to ensure set-up times for the dynamic circuits that evaluate when boost clock boost is de-asserted. As an example, a digital circuit clock dclk is shown, which controls an evaluation of a circuit block via a falling edge. An example set-up interval $t_{SU}$ is shown to illustrate how the timing of boost clock boost is controlled with respect to another clock that controls digital circuit state evaluation (including memory stores or reads) so that dynamic internal power supply node voltage $V_{DDV}$ has a boosted value during a critical timing period during which the boosted voltage improves performance over performance that would be achieved at the lower value of static power supply voltage $V_{DD}$, i.e. without boost circuit 20A. Not only does virtual power supply/boost circuit 20A provide a timed increase in dynamic internal power supply node voltage $V_{DDV}$, but the energy required to produce the increase, which is substantial due to the large shunt capacitance $C_{SHUNT}$ of all of the devices connected to dynamic internal power supply node 5, is stored in inductor L1 during the time before the assertion of boost clock boost and used to aid in producing the next peak of dynamic internal power supply node voltage $V_{DDV}$ prior to the next de-assertion of boost clock boost, i.e. the next evaluation.

Figure 3B:
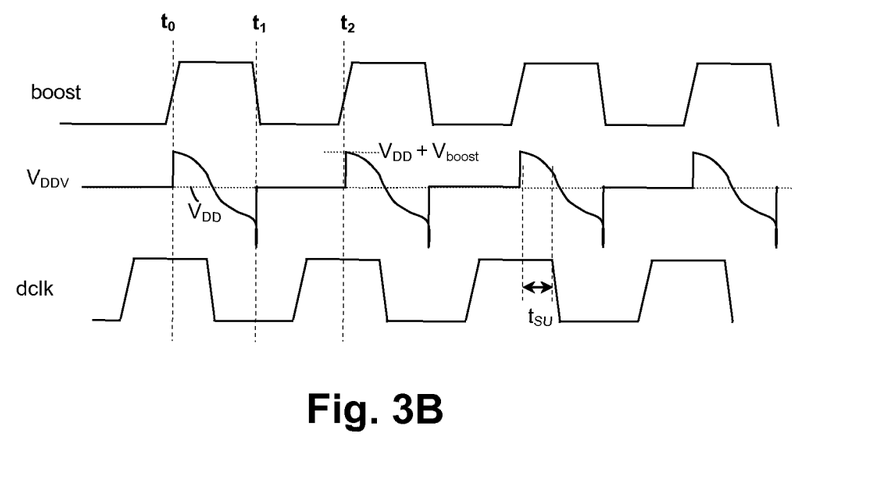
FIG. 3B is a waveform diagram illustrating signals within virtual power supply/boost circuit 20B of FIG. 4.
Figure 4:
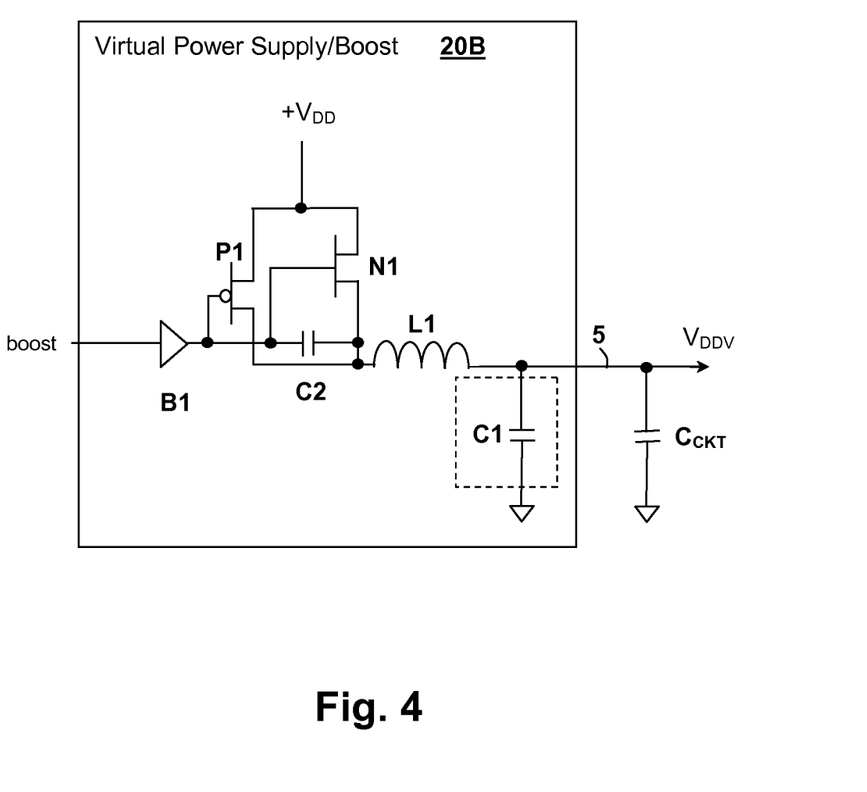
FIG. 4 is a schematic diagram of a virtual supply boost circuit 20B according to a second example that may be used in the integrated circuit of FIG. 1.

Referring now to FIG. 4, a second example of a virtual power supply/boost circuit 20B that may be alternatively used to implement virtual power supply/boost circuit 20 of integrated circuit 10 of FIG. 1 is shown. Virtual power supply/boost circuit 20B is similar to virtual power supply/boost circuit 20A of FIG. 2, so only differences between virtual power supply/boost circuit 20B and virtual power supply/boost circuit 20A will be described below. In virtual power supply/boost circuit 20B, a clock buffer B1 is shown that isolates the gate of boost transistor N1 and transistor P1 from boost clock boost. Buffer B1 will generally be present in other implementations of virtual power supply/boost circuit 20B, such as in virtual power supply/boost circuit 20A of FIG. 1, but in the instant virtual power supply/boost circuit 20B, a capacitor C2 is included to couple boost clock boost to dynamic internal power supply node 5, so that the rising edge of boost clock boost imposes a transient of greater magnitude on dynamic internal power supply node voltage $V_{DDV}$. FIG. 3B shows a simulation result for virtual power supply/boost circuit 20B, in which a sharp increase dynamic internal power supply node voltage $V_{DDV}$ occurs at the rising edge of boost clock boost, i.e., at the beginning of the evaluation cycle.

Figure 5:
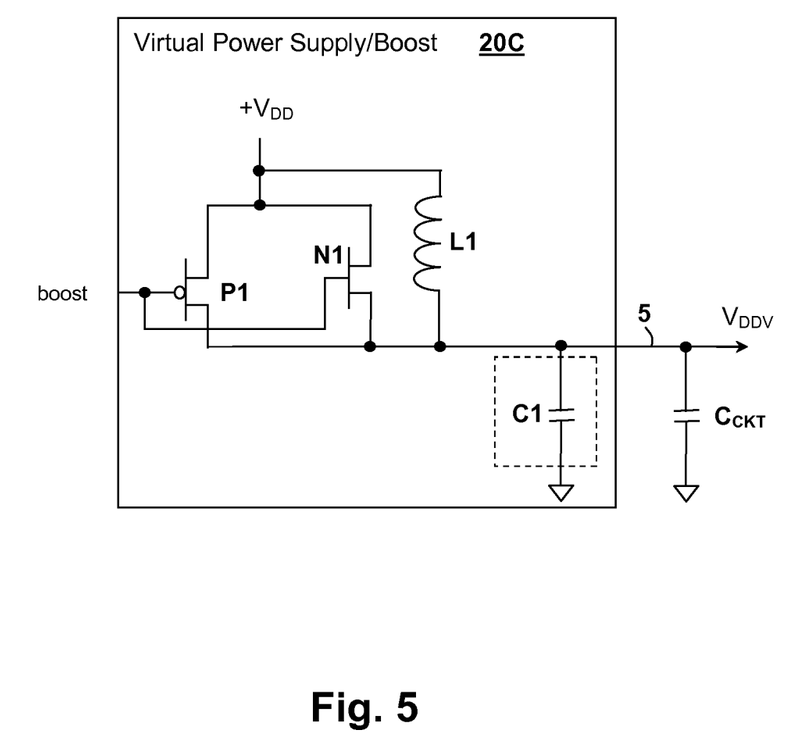
FIG. 5 is a schematic diagram of a virtual supply boost circuit 20C according to a third example that may be used in the integrated circuit of FIG. 1.

Referring now to FIG. 5, a third example of a virtual power supply/boost circuit 20C that may be alternatively used to implement virtual power supply/boost circuit 20 of integrated circuit 10 of FIG. 1 is shown. Virtual power supply/boost circuit 20C is similar to virtual power supply/boost circuit 20A of FIG. 2, so only differences between virtual power supply/boost circuit 20C and virtual power supply/boost circuit 20A will be described below. In virtual power supply/boost circuit 20C, inductor L1 couples the dynamic internal power supply node 5 to static power supply voltage $V_{DD}$, so that a parallel resonant circuit is formed by inductor L1 and the total capacitance provided by circuit capacitance $C_{CIRCUIT}$ and optional capacitance C1, with respect to dynamic internal power supply node 5. The behavior of virtual power supply/boost circuit 20C is very similar to the behavior of virtual power supply/boost circuit 20A illustrated in FIG. 2.

Figure 6:
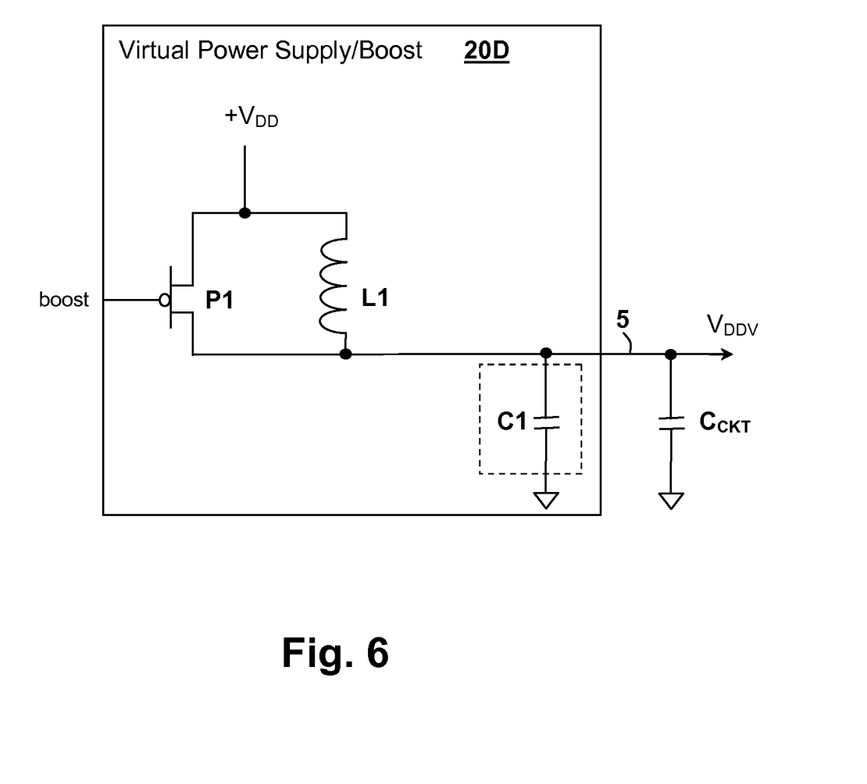
FIG. 6 is a schematic diagram of a virtual supply boost circuit 20D according to a fourth example that may be used in the integrated circuit of FIG. 1.

Referring now to FIG. 6, a fourth example of a virtual power supply/boost circuit 20D that may be alternatively used to implement virtual power supply/boost circuit 20 of integrated circuit 10 of FIG. 1 is shown. Virtual power supply/boost circuit 20D is similar to virtual power supply/boost circuit 20C of FIG. 5, so only differences between virtual power supply/boost circuit 20D and virtual power supply/boost circuit 20C will be described below. In virtual power supply/boost circuit 20C, inductor L1 couples dynamic internal power supply node 5 to static power supply voltage $V_{DD}$, so that a parallel resonant circuit is formed by inductor L1 and the total capacitance provided by circuit capacitance $C_{CKT}$ and optional capacitance C1, with respect to dynamic internal power supply node 5. However, no boost transistor is included, so the entire control of the behavior of dynamic internal power supply node voltage $V_{DDV}$ is controlled directly by transistor P1 and the resonant behavior of inductor L1 with the total capacitance provided by circuit capacitance $C_{CKT}$ and optional capacitance C1.

Figure 7:
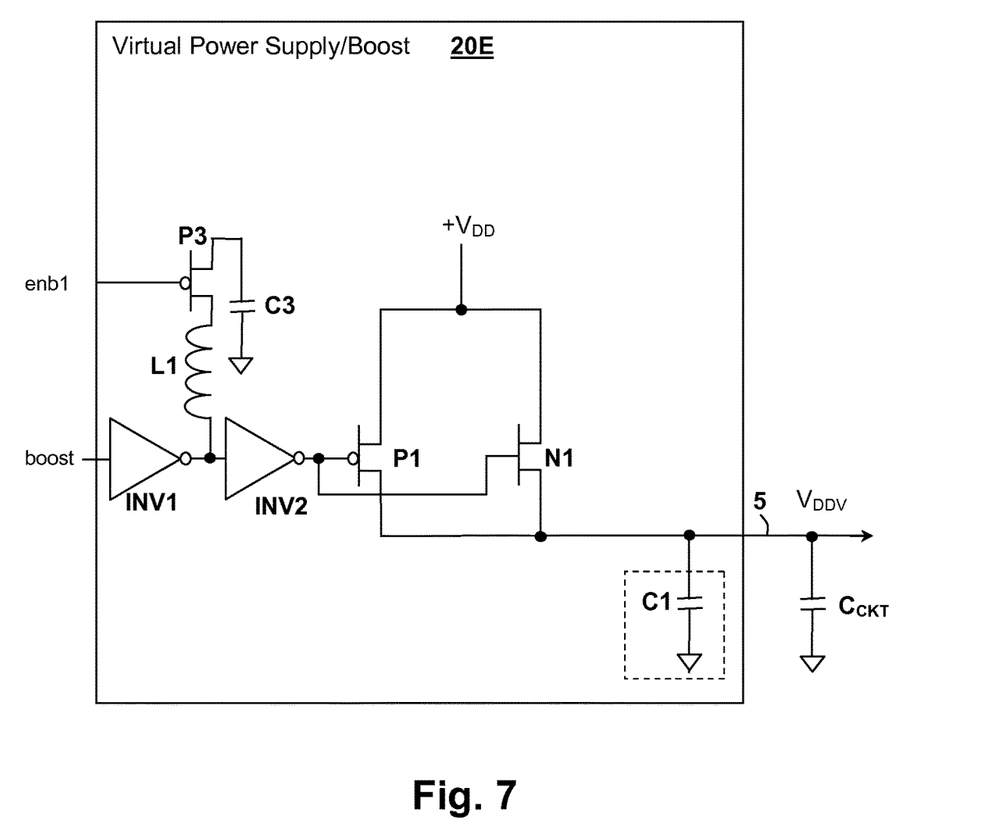
FIG. 7 is a schematic diagram of a virtual supply boost circuit 20E according to a fifth example that may be used in the integrated circuit of FIG. 1.

Referring now to FIG. 7, a fifth example of a virtual power supply/boost circuit 20E that may be alternatively used to implement virtual power supply/boost circuit 20 of integrated circuit 10 of FIG. 1 is shown. Virtual power supply/boost circuit 20E is similar to virtual power supply/ boost circuit 20B of FIG. 4, so only differences between virtual power supply/boost circuit 20E and virtual power supply/boost circuit 20B will be described below. In virtual power supply/boost circuit 20E, inductor L1 is coupled to the output of an inverter INV1 and a capacitor C3 is included to store energy after the time when a transistor P3 is enabled by control signal enb1, by holding the voltage across capacitor C3 when transistor P3 turns off. Control signal enb1 is generally in phase with boost clock boost, so that when boost clock boost rises and the output of inverter INV1 falls, transistor P3 turns off, holding the voltage across capacitor C3 and storing energy. When boost clock boost falls, the output of inverter INV1 rises and transistor P3 turns on, further increasing the boost provided by inductor L1 at the output of inverter INV1 by applying the voltage across capacitor C3 to the other terminal of inductor L1. Inductor L1 resonates with the capacitance at the output of inverter INV1, which when control signal enb1 is active, includes the capacitance of capacitor C3 and which also includes the input capacitance of another inverter INV2 which drives the gates capacitances of boost transistor N1 and transistor P1. Since changes in output of inverter INV1 are followed through inverter INV2 at the gate of boost transistor N1, which is then followed at the source of boost transistor N1, the boosted waveform produced by the resonant circuit formed by inductor L1 and the capacitance at the output of inverter INV1 will be imposed on dynamic internal power supply node voltage $V_{DDV}$.

Figure 8:
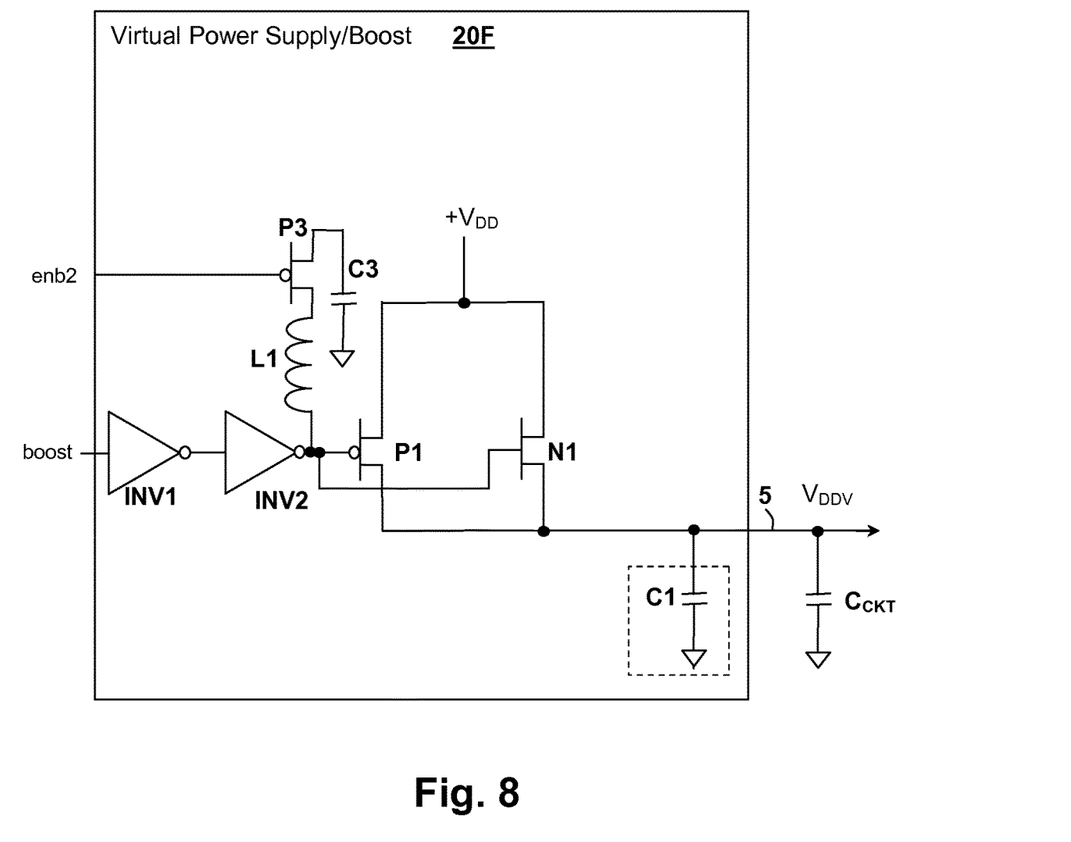
FIG. 8 is a schematic diagram of a virtual supply boost circuit 20F according to a sixth example that may be used in the integrated circuit of FIG. 1.

Referring now to FIG. 8, a sixth example of a virtual power supply/boost circuit 20F that may be alternatively used to implement virtual power supply/boost circuit 20 of integrated circuit 10 of FIG. 1 is shown. Virtual power supply/boost circuit 20F is similar to virtual power supply/boost circuit 20E of FIG. 7, so only differences between virtual power supply/boost circuit 20F and virtual power supply/boost circuit 20E will be described below. In virtual power supply/boost circuit 20F, the circuit formed by inductor L1, capacitor C3 and transistor N3 is connected to the output of inverter INV2 and a control signal enb2, which has a phase generally opposite that of boost clock boost, operates transistor P3, so that when the voltage at the output of inverter INV2 rises, transistor P3 is enabled, further increasing the boosted voltage.

Figure 9:
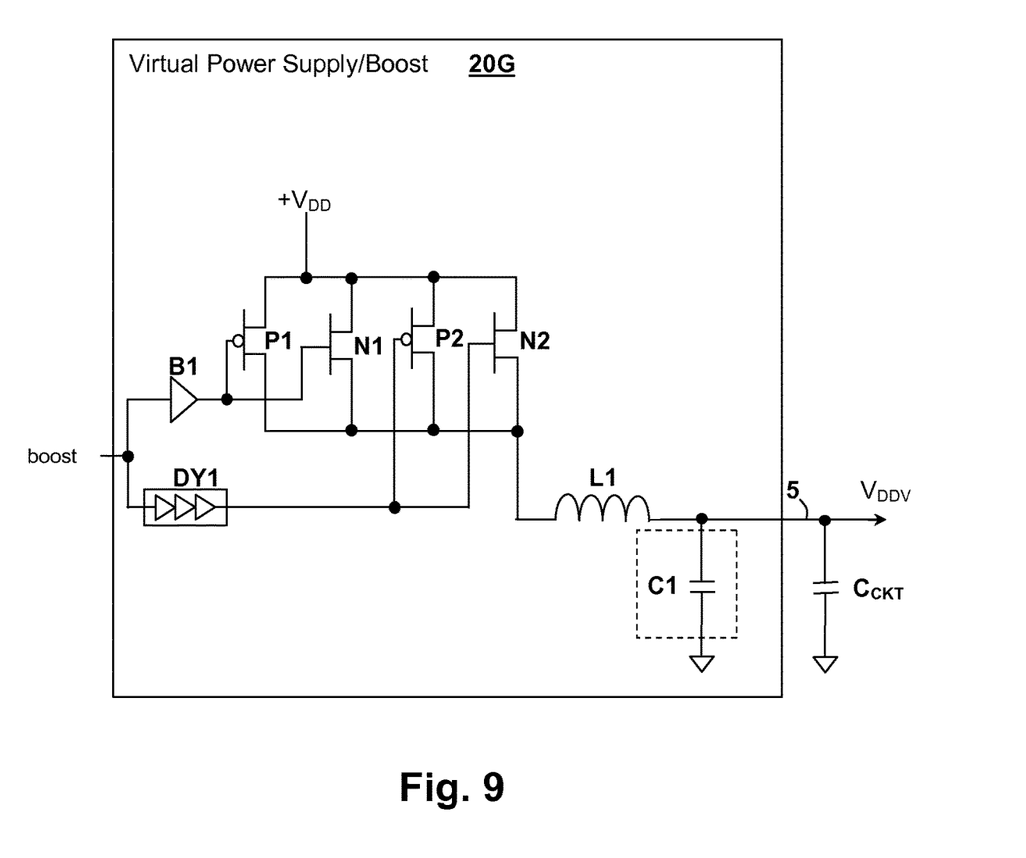
FIG. 9 is a schematic diagram of a virtual supply boost circuit 20G according to a seventh example that may be used in the integrated circuit of FIG. 1.

Referring now to FIG. 9, a seventh example of a virtual power supply/boost circuit 20G that may be alternatively used to implement virtual power supply/boost circuit 20 of integrated circuit 10 of FIG. 1 is shown. Virtual power supply/boost circuit 20G is similar to virtual power supply/boost circuit 20A of FIG. 2, so only differences between virtual power supply/boost circuit 20A and virtual power supply/boost circuit 20G will be described below. In virtual power supply/boost circuit 20G, just as in the example virtual power supply/boost circuit 20A of FIG. 2, a boost is achieved by the coupling of the rising edge of boost clock boost through the gates of boost transistors N1 and N2. In virtual power supply/boost circuit 20G multiple boosts are provided by delaying boost clock boost through buffer B1 and delay circuit DY1, which can be tuned by selection of delay circuit DY1 to locate the peak of boosted dynamic internal power supply node voltage $V_{DDV}$ at the desired point in the evaluation cycle of boost clock boost.

Figure 10:
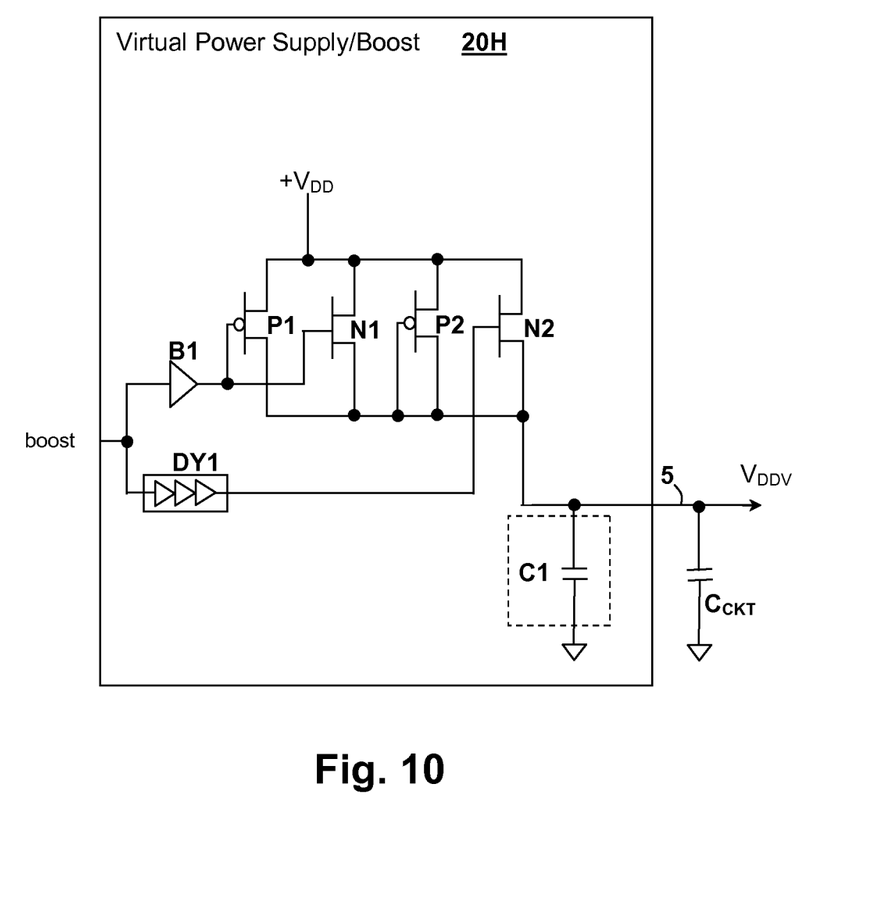
FIG. 10 is a schematic diagram of a virtual supply boost circuit 20H according to a eighth example that may be used in the integrated circuit of FIG. 1.

Referring now to FIG. 10, an eighth example of a virtual power supply/boost circuit 20H that may be alternatively used to implement virtual power supply/boost circuit 20 of integrated circuit 10 of FIG. 1 is shown. Virtual power supply/boost circuit 20H is similar to virtual power supply/ boost circuit 20G of FIG. 9, so only differences between virtual power supply/boost circuit 20H and virtual power supply/boost circuit 20G will be described below. In virtual power supply/boost circuit 20G, inductor L1 is omitted, however, just as in the example virtual power supply/boost circuit 20B of FIG. 4, a boost is achieved by the coupling of the rising edge of boost clock boost through the gates of boost transistors N1 and N2. As in virtual power supply/ boost circuit 20G of FIG. 9, instant virtual power supply/ boost circuit 20H can be tuned by selection of delay circuit DY1 to locate the peak of boosted dynamic internal power supply node voltage $V_{DDV}$ at the desired point in the evaluation cycle of boost clock boost.

It is understood that the above examples are not exhaustive, and other combinations and implementations in accordance with the examples above are possible, such as including additional boost circuits to any of the embodiments, including additional capacitive coupling of boost clock boost in the boost circuits that did not include such coupling and using multiple inductors to resonate both the dynamic internal power supply node 5 and buffered nodes such as in virtual power supply/boost circuit 20E of FIG. 7.

Figure 11:
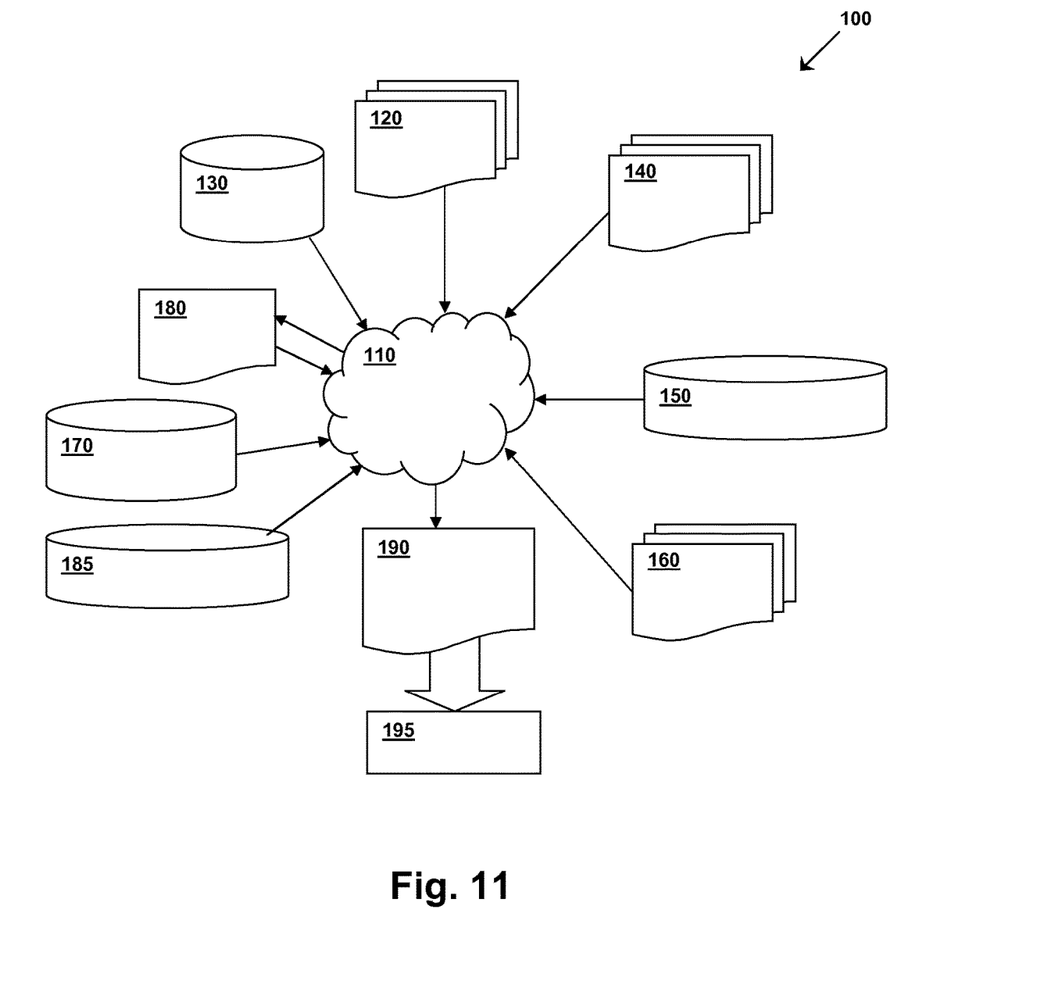
FIG. 11 is a flow diagram of a design process that can be used to fabricate, manufacture and test the integrated circuit of FIG. 1.

FIG. 11 shows a block diagram of an exemplary design flow 100 used for example, in semiconductor IC logic design, simulation, test, layout, and manufacture. Design flow 100 includes processes, machines and/or mechanisms for processing design structures or devices to generate logically or otherwise functionally equivalent representations of the design structures and/or devices described above and shown in FIGS. 1-2 and 4-10. The design structures processed and/or generated by design flow 100 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 100 may vary depending on the type of representation being designed. For example, a design flow 100 for building an application specific IC (ASIC) may differ from a design flow 100 for designing a standard component or from a design flow 100 for instantiating the design into a programmable array, for example a programmable gate array (PGA) or a field programmable gate array (FPGA) offered by Altera Inc. or Xilinx, Inc.

FIG. 11 illustrates multiple such design structures including an input design structure 120 that is preferably processed by a design process 110. Input design structure 120 may be a logical simulation design structure generated and processed by design process 110 to produce a logically equivalent functional representation of a hardware device. Input design structure 120 may also or alternatively comprise data and/or program instructions that when processed by design process 110, generate a functional representation of the physical structure of a hardware device. Whether representing functional and/or structural design features, input design structure 120 may be generated using electronic computer-aided design (ECAD) such as implemented by a core developer/designer. When encoded on a machine-readable data transmission, gate array, or storage medium, input design structure 120 may be accessed and processed by one or more hardware and/or software modules within design process 110 to simulate or otherwise functionally represent an electronic component, circuit, electronic or logic module, apparatus, device, or system such as those shown in FIGS. 1-2 and 4-10. As such, input design structure 120 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 110 preferably employs and incorporates hardware and/or software modules for synthesizing, translating, or otherwise processing a design/simulation functional equivalent of the components, circuits, devices, or logic structures shown in FIGS. 1-2 and 4-10 to generate a Netlist 180 which may contain design structures such as input design structure 120. Netlist 180 may comprise, for example, compiled or otherwise processed data structures representing a list of wires, discrete components, logic gates, control circuits, 110 devices, models, etc. that describes the connections to other elements and circuits in an integrated circuit design. Netlist 180 may be synthesized using an iterative process in which netlist 180 is resynthesized one or more times depending on design specifications and parameters for the device. As with other design structure types described herein, netlist 180 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 110 may include hardware and software modules for processing a variety of input data structure types including Netlist 180. Such data structure types may reside, for example, within library elements 130 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 140, characterization data 150, verification data 160, design rules 170, and test data files 185 which may include input test patterns, output test results, and other testing information. Design process 110 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 110 without deviating from the scope and spirit of the invention. Design process 110 may also include modules for performing standard circuit design processes such as timing analysis, verification, design rule checking, place and route operations, etc.

Design process 110 employs and incorporates logic and physical design tools such as HDL compilers and simulation model build tools to process input design structure 120 together with some or all of the depicted supporting data structures along with any additional mechanical design or data (if applicable), to generate a second design structure 190. Design structure 190 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to input design structure 120, design structure 190 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-2 and 4-10. In one embodiment, design structure 190 may comprise a compiled, executable HDL simulation model that functionally simulates the devices shown in FIGS. 1-2 and 4-10.

Design structure 190 may also employ a data format used for the exchange of layout data of integrated circuits and/or symbolic data format (e.g. information stored in a GDSII (GDS2), GL1, OASIS, map files, or any other suitable format for storing such design data structures). Design structure 190 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-2 and 4-10. Design structure 190 may then proceed to a stage 195 where, for example, design structure 190: proceeds to tape-out, is released to manufacturing, is released to a mask house, is sent to another design house, is sent back to the customer, etc.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of providing a supply voltage to a dynamic internal power supply node of a group of digital circuits, the method comprising:
   coupling the dynamic internal power supply node to a static power supply that supplies a substantially constant power supply voltage with a first transistor;
   disabling the first transistor in response to a first phase of a boost clock that has controlled timing with respect to at least one other clock that synchronizes logic state changes within the group of digital circuits;
   resonating a voltage of the dynamic internal power supply node with an inductor and at least one capacitance coupled to the dynamic internal power supply node, so that when the disabling begins to disable the first transistor, a voltage of the dynamic internal power supply node increases in magnitude to a value substantially greater than a magnitude of the power supply voltage during a boost interval in which the at least one other clock causes the group of digital circuits to evaluate, and wherein the magnitude of the voltage of the dynamic internal power supply node falls to the magnitude of the power supply voltage before the first phase of the boost clock is complete and energy is stored in the inductor to boost the magnitude of the voltage of the dynamic internal power supply node during a next boost interval, wherein a first terminal of the inductor is connected to the dynamic internal power supply node and the at least one capacitance includes a circuit capacitance due to devices connected between the dynamic internal power supply node and a return node;

further coupling the dynamic internal power supply node to the static power supply using a boost transistor having a gate coupled to the boost clock, a source terminal connected to the dynamic internal power supply node and a drain terminal connected to the static power supply;

coupling the boost clock to a gate of the boost transistor and a gate of the first transistor with a buffer;

providing a capacitor between an output of the clock buffer and the dynamic internal power supply node;

providing a second transistor coupled in series with the capacitor; and controlling a gate of the second transistor with a control signal having controlled timing with respect to the boost clock.

2. The method of claim 1, wherein the boost transistor has a gate terminal connected to the gate terminal of the first transistor, whereby the boost transistor is enabled by the first phase of the boost clock, wherein a source terminal of the boost transistor is connected to a source terminal of the first transistor, and wherein the inductor and the at least one capacitance are coupled to the gate terminals of the first transistor and the boost transistor.

3. The method of claim 1, wherein the inductor has a second terminal connected to the static power supply, wherein the resonating resonates the inductor and the at least one capacitance as a series resonant circuit with respect to the dynamic internal power supply node.

4. A circuit for providing a supply voltage to a dynamic internal power supply node of a group of digital circuits, comprising:

a first transistor for coupling the dynamic internal power supply node to a static power supply that supplies a substantially constant power supply voltage, wherein the first transistor is disabled in response to a first phase of a boost clock that has controlled timing with respect to at least one other clock that synchronizes logic state changes within the group of digital circuits;

an inductor coupled to the dynamic internal power supply node for resonating with at least one capacitance coupled to the dynamic internal power supply node so that when the boost clock begins to disable the first transistor, a voltage of the dynamic internal power supply node increases in magnitude to a value substantially greater than a magnitude of the power supply voltage during a boost interval in which the at least one other clock causes the group of digital circuits to evaluate, wherein the magnitude of the voltage of the dynamic internal power supply node falls to the magnitude of the power supply voltage before the first phase of the boost clock is complete and energy is stored in the inductor to boost the magnitude of the voltage of the dynamic internal power supply node during a next boost interval, wherein a first terminal of the inductor is connected to the dynamic internal power supply node and the at least one capacitance includes a circuit capacitance due to devices connected between the dynamic internal power supply node and a return node, a boost transistor having a gate coupled to the boost clock, a source terminal connected to a second terminal of the inductor, and a drain terminal connected to the static power supply;

a clock buffer that couples the boost clock to a gate of the boost transistor and a gate of the first transistor;

a capacitor coupled between an output of the clock buffer and the dynamic internal power supply node; and a second transistor coupled in series with the capacitor, and wherein the gate of the second transistor is connected to a control signal having controlled timing with respect to the boost clock.

5. The circuit of claim 4, wherein the boost transistor has a gate terminal connected to the gate terminal of the first transistor, whereby the boost transistor is enabled by the first phase of the boost clock, and having a source terminal connected to a source terminal of the first transistor, wherein the inductor and the at least one capacitance are coupled to the gate terminals of the first transistor and the boost transistor, whereby the first transistor and the boost transistor couple the inductor and the at least one capacitance to the dynamic internal power supply node.

6. The circuit of claim 4, wherein the inductor has a second terminal connected to the static power supply, wherein the inductor and the at least one capacitance form a series resonant circuit with respect to the dynamic internal power supply node.

* * * * *